(12) United States Patent
Shinohara

(10) Patent No.: US 8,351,134 B2
(45) Date of Patent: Jan. 8, 2013

(54) FILTER, IMAGE PICKUP LENS, IMAGE PICKUP APPARATUS, AND PORTABLE TERMINAL DEVICE

(75) Inventor: Yoshikazu Shinohara, Saitama (JP)

(73) Assignee: Fujifilm Corporation, Tokyo (JP)

( * ) Notice: Subject to any disclaimer, the term of this patent is extended or adjusted under 35 U.S.C. 154(b) by 139 days.

(21) Appl. No.: 13/081,181

(22) Filed: Apr. 6, 2011

(65) Prior Publication Data
US 2011/0242684 A1    Oct. 6, 2011

(30) Foreign Application Priority Data
Apr. 6, 2010 (JP) .................. 2010-087617

(51) Int. Cl.
G02B 9/00 (2006.01)
G03F 5/00 (2006.01)

(52) U.S. Cl. ........................ 359/738; 359/893
(58) Field of Classification Search .......... 349/153; 359/297, 738, 893
See application file for complete search history.

(56) References Cited

U.S. PATENT DOCUMENTS

| | | | | | |
|---|---|---|---|---|---|
| 3,905,822 | A | * | 9/1975 | Marks | 359/893 |
| 4,906,081 | A | * | 3/1990 | Yasuda | 359/723 |
| 5,161,027 | A | * | 11/1992 | Liu | 348/766 |
| 5,260,727 | A | * | 11/1993 | Oksman et al. | 351/159.03 |
| 7,099,555 | B2 | * | 8/2006 | Onuki et al. | 385/147 |

FOREIGN PATENT DOCUMENTS

| | | |
|---|---|---|
| JP | 11-231209 | 8/1999 |
| JP | 2006-145831 | 6/2006 |

* cited by examiner

*Primary Examiner* — David N Spector
(74) *Attorney, Agent, or Firm* — Young & Thompson

(57) ABSTRACT

A filter, to be disposed concentrically with an optical axis of an imaging lens, capable of accurately controlling light transmission variation characteristics and effectively providing an apodization effect or a peripheral light intensity correction effect. The filter includes opaque dots disposed according to a honeycomb arrangement from a central portion toward a peripheral portion so as to have, at least partially, a Gaussian distribution like dot density and is structured to satisfy Condition Expression (1) given below when a size of the dots is taken as d.

$0.003 \text{ mm} \leq d \leq 0.010 \text{ mm}$  (1).

14 Claims, 6 Drawing Sheets

FILTER, IMAGE PICKUP LENS, IMAGE PICKUP APPARATUS, AND PORTABLE TERMINAL DEVICE

BACKGROUND OF THE INVENTION

1. Field of the Invention

The present invention relates to an image pickup lens used for an image pickup apparatus incorporated in a portable terminal device or the like, and more particularly to a filter to be disposed concentrically with an optical axis of an imaging lens to exhibit an apodization effect or a peripheral light intensity correction effect.

2. Description of the Related Art

Generally, the performance of image pickup lenses is evaluated by the imaging capability at the focal plane. Consequently, a number of proposals with respect to aberration corrections for improving the imaging capability have been made. In addition to the imaging capability, it is also very important for image pickup lenses used in cameras, appearances of out-of-focus images (foreground blur and background blur). For example, in a portrait photograph with a person arranged in the center or a photograph of a flower obtained by macro photography, the impression of the photograph image depends largely on the appearance of an out-of-focus image of a portion other than the main subject (e.g., background portion). In macro photography of a subject using a macro lens with an imaging magnification of about ¼ to ½, in particular, a background portion other than the main subject portion, in most cases, becomes an out-of-focus image and, therefore, the appearance of the out-of-focus image is particularly important.

Various types of appearances of out-of-focus images are known and it is generally said to be a preferable appearance that gives soft atmosphere in which an original shape of an object in an out-of-focus image is easily identifiable with less muddy color mixture and is fluffily blurred as a whole.

As for a lens system designed for improving the appearance of an out-of-focus image, an image pickup lens having an apodization filter that exhibits an appodization effect is known as described, for example, in Japanese Unexamined Patent Publication Nos. 2006-145831 and 11(1999)-231209. The appodization effect improves an appearance of an out-of-focus image to the aforementioned favorable appearance by gradually decreasing the light transmission rate as the distance from the center of the optical axis is increased in a direction perpendicular to the optical axis and changing a light intensity distribution of the out-of-focus image.

Further, a peripheral light intensity correction filter is also known in which, contrary to the apodization filter, the light transmission rate is gradually increased as the distance from the center of the optical axis is increased in a direction perpendicular to the optical axis and equalizing light intensities in a central portion and a peripheral portion on the image forming plane.

When decreasing or increasing the light transmission rate according to the distance from the center of the optical axis in a direction perpendicular to the optical axis, the apodization filter or the peripheral light intensity correction filter can not efficiently exhibit the apodization effect or the peripheral light intensity correction effect unless the light transmission rate is changed accurately according to a predetermined rule.

An apodization filter or a peripheral light intensity correction filter is realized by printing or applying opaque dots or opaque concentric circles on a transparent substrate. Such filters change the light transmission rate by locally changing the application density of the dots or concentric circles. Conventional filters have difficulties in accurately changing the light transmission rate due to problems of accuracy in arranging a pattern of dots or concentric circles and in printing or applying the pattern. Such problems are more significant, in particular, for filters used in small image pickup apparatuses incorporated in portable terminals and the like.

The present invention has been developed in view of the circumstances described above, and it is an object of the present invention to provide a filter, an image pickup lens, an image pickup apparatus, and a portable terminal device capable of accurately controlling light transmission rate variation characteristics of the filter and effectively providing an apodization effect or a peripheral light intensity correction effect.

SUMMARY OF THE INVENTION

A filter of the present invention is a filter to be disposed concentrically with an optical axis of an imaging lens to exhibit an apodization effect or a peripheral light intensity correction effect, wherein the filter includes opaque dots disposed according to a honeycomb arrangement from a central portion toward a peripheral portion so as to have, at least partially, a Gaussian distribution like dot density and is structured to satisfy Condition Expression (1) given below when a size of the dots is taken as d.

$$0.003 \text{ mm} \leq d \leq 0.010 \text{ mm} \tag{1}$$

Here, the definition of "honeycomb arrangement" will be described.

The term "honeycomb arrangement" as used herein refers to an arrangement in which, when a certain dot disposition position (dot center position) is taken as a reference position, an adjacent dot disposition position is provided at an equal distance and at each 60° from the reference position, and if it is assumed that regular hexagons are disposed without any gap like a honeycomb, the center C of each regular hexagon is the dot disposition position, as illustrated in FIG. 12. Then, the presence or absence of dot is determined with respect to each dot disposition position.

In order to accurately change the light transmission rate according to the distance from the center of the optical axis in a direction perpendicular to the optical axis based on a predetermined rule, it is most preferable that the dot has a regular hexagonal shape. But, in a case where printing or the like is used, in particular, it is difficult to print tiny regular hexagonal dots that satisfy Condition Expression (1) above. Therefore, it is preferable that the dots have a circular shape as a shape that can be achieved more easily. It should be appreciated, however, that the dot shape is not limited to the regular hexagon and circle, and may have other shapes.

The term "dot size d" as used herein refers to, when the dots have a circular shape, to the diameter of the dots and, when the dots have a shape other than the circular shape, to the widest width when the shape is sandwiched in parallel.

Preferably, the filter of the present invention satisfies Condition Expression (2) given below when a distance between adjacent dots is taken as D in the honeycomb arrangement.

$$0.9d < D < 1.1d \tag{2}$$

Further, the peripheral portion may have a higher dot density than that of any other portion of the filter. In this case, it is preferable that no dot is disposed within a range of a predetermined radius r1 from the center of the filter and the filter satisfies Condition Expression (3) given below when an effective radius of the filter is taken as ra.

$$0.10ra < r1 < 0.15ra \quad (3)$$

Still further, the peripheral portion may have a lower dot density than that of any other portion of the filter. In this case, it is preferable that no dot is disposed within a range of predetermined radius r2 from an effective radius position of the filter and the filter satisfies Condition Expression (4) given below when an effective radius of the filter is taken as ra.

$$0.10ra < r2 < 0.15ra \quad (4)$$

The filter may include a transparent substrate on which the dots are printed or a transmissive liquid crystal panel capable of exhibiting opacity only in areas of the dots.

A first image pickup lens of the present invention is an image pickup lens having the filter described above and an imaging lens.

A second image pickup lens of the present invention is an image pickup lens having the filter that includes a transparent substrate on which the dots are printed, an imaging lens, and a shifting unit for shifting the filter between a position concentric with an optical axis of the imaging lens and a position outside of a light beam passing through the imaging lens.

A third image pickup lens of the present invention is an image pickup lens having the filter that includes the transmissive liquid crystal panel capable of exhibiting opacity only in areas of the dots, an imaging lens, and a control unit for switching the areas of the dots of the transmissive liquid crystal panel between a transparent state and an opaque state.

An image pickup apparatus of the present invention is an apparatus having one of the image pickup lenses described above.

A portable terminal device of the present invention is a device having one of the image pickup lenses described above.

The filter of the present invention is a filter to be disposed concentrically with an optical axis of an imaging lens to exhibit an apodization effect or a peripheral light intensity correction effect. The filter includes opaque dots disposed according to a honeycomb arrangement from a central portion toward a peripheral portion so as to have, at least partially, a Gaussian distribution like dot density and is structured to satisfy Condition Expression (1) given below when a size of the dots is taken as d.

When light transmission rate is partially changed by partially changing the opaque dot arrangement density, this allows the light transmission rate to be accurately changed to a desired characteristic so that the filter may efficiently exhibit an apodization effect or a peripheral light intensity correction effect.

$$0.003\ mm \leq d \leq 0.010\ mm \quad (1)$$

Here, if d exceeds the upper limit of Condition Expression (1) above, the light intensity variation is likely to be mottled and the light transmission rate can not be changed accurately. On the other hand, if d exceeds the lower limit of Condition Expression (1) above, the dot becomes too small with respect to the wavelength of the light and is unable to block the light, so that an apodization filter or a peripheral light intensity correction filter is not realized.

A filter having a favorable property may be realized by forming the filter so as to satisfy Condition Expression (2) given below when a distance between adjacent dots is taken as D in the honeycomb arrangement.

$$0.9d < D < 1.1d \quad (2)$$

Here, if D exceeds the upper limit of Condition Expression (2) above, the distance between dots is too great to block the light, so that an apdization filter or a peripheral light intensity correction filter is not realized. On the other hand, if D exceeds the lower limit of Condition Expression (2) above, the light intensity variation is likely to be mottled and the light transmission rate can not be changed accurately.

Further, the filter may be realized easily by forming the dots in a circular shape.

Further, an apodization filter may be realized by causing the peripheral portion to have a higher dot density than that of any other portion of the filter. In this case, when the dot density is reduced and dots are sparsely scattered, an adverse effect that the scattered dots appear as dirt is caused by filter effect. By forming the filter such that no dot is disposed within a range of predetermined radius r1 from the center of the filter, and to satisfy Condition Expression (3) given below when an effective radius of the filter is taken as ra. This allows a filter with reduced adverse effect described above to be realized.

$$0.10ra < r1 < 0.15ra \quad (3)$$

Here, if r1 exceeds the upper limit of Condition Expression (3) above, it is difficult for the filter to exhibit an advantageous effect because a light intensity change area is small. On the other hand, if r1 exceeds the lower limit of Condition Expression (3) above, the dot scattering and, hence, the adverse effect described above are likely to occur.

Further, a peripheral light intensity correction filter may be realized by causing the peripheral portion to have a lower dot density than that of any other portion of the filter. In this case, when the dot density is reduced and dots are sparsely scattered, an adverse effect that the scattered dots appear as dirt is caused by filter effect. By forming the filter such that no dot is disposed within a range of predetermined radius r2 from an effective radius position of the filter and to satisfy Condition Expression (4) given below when an effective radius of the filter is taken as ra. This allows a filter with reduced adverse effect described above to be realized.

$$0.10ra < r2 < 0.15ra \quad (4)$$

Here, if r2 exceeds the upper limit of Condition Expression (4) above, it is difficult for the filter to exhibit an advantageous effect because a light intensity change area is small. On the other hand, if r2 exceeds the lower limit of Condition Expression (4) above, the dot scattering and, hence, the adverse effect described above are likely to occur.

The filter may be formed easily by printing the dots on a transparent substrate or using a transmissive liquid crystal panel capable of exhibiting opacity only in areas of the dots.

The first image pickup lens of the present invention includes the filter described above and an imaging lens so that the image pickup lens may effectively exhibit an apodization effect or a peripheral light intensity correction effect.

The second image pickup lens of the present invention includes a filter that includes a transparent substrate on which the dots are printed, an imaging lens, and a shifting unit for shifting the filter between a position concentric with an optical axis of the imaging lens and a position outside of a light beam passing through the imaging lens. The third image pickup lens of the present invention includes a filter that includes the transmissive liquid crystal panel capable of exhibiting opacity only in areas of the dots, an imaging lens, and a control unit for switching the areas of the dots of the transmissive liquid crystal panel between a transparent state and an opaque state.

The use of a filter, such as an apodization filter or a peripheral light intensity correction filter, in performing imaging under dark environment causes it difficult to obtain a sufficient amount of light for the imaging. But the embodiments of the image pickup lens in the manner as described above allows imaging with or without the filter and, hence, optimum imaging to be performed according to the imaging environment.

The image pickup apparatus and portable terminal device of the present invention may efficiently exhibit an apodization effect or a peripheral light intensity correction effect as they include the image pickup lens described above.

DESCRIPTION OF THE PREFERRED EMBODIMENTS

Figure 1:
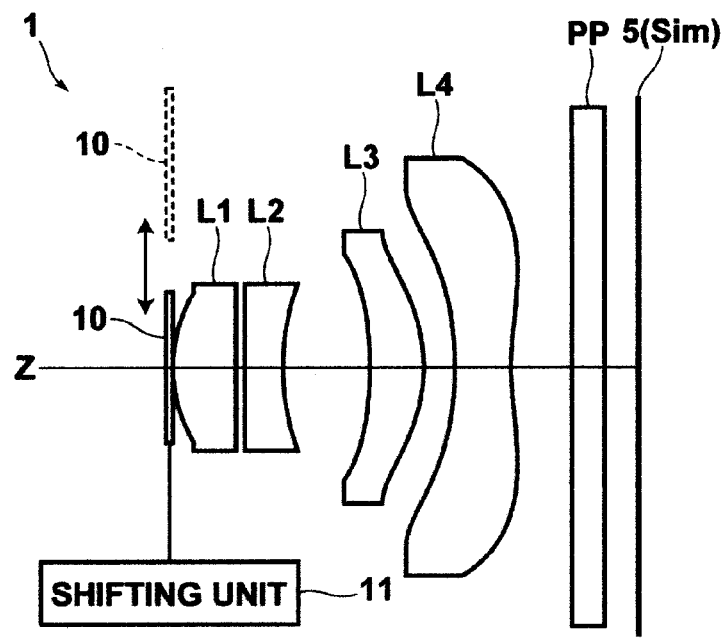
FIG. 1 illustrates a configuration of an image pickup lens according to a first embodiment of the present invention.
Figure 2:
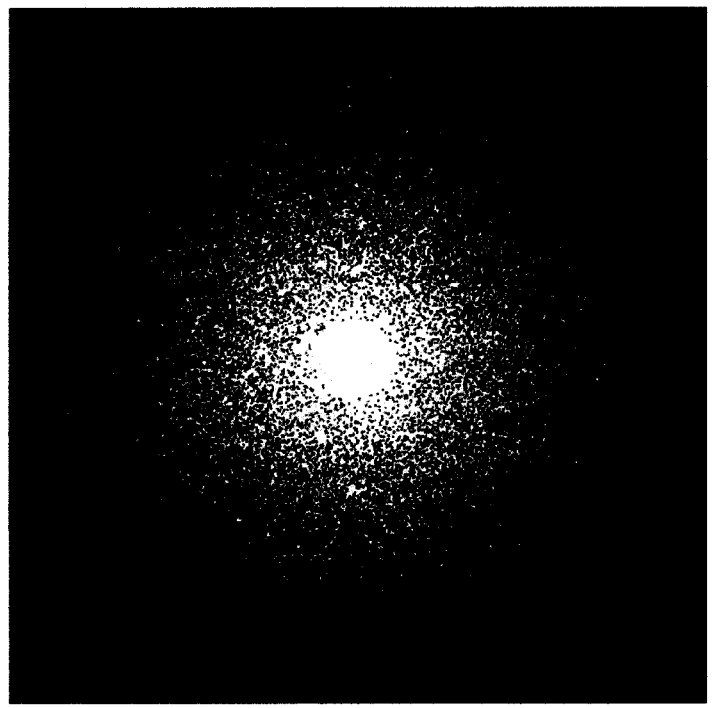
FIG. 2 illustrates an example apodization filter of the image pickup lens described above.
Figure 3:
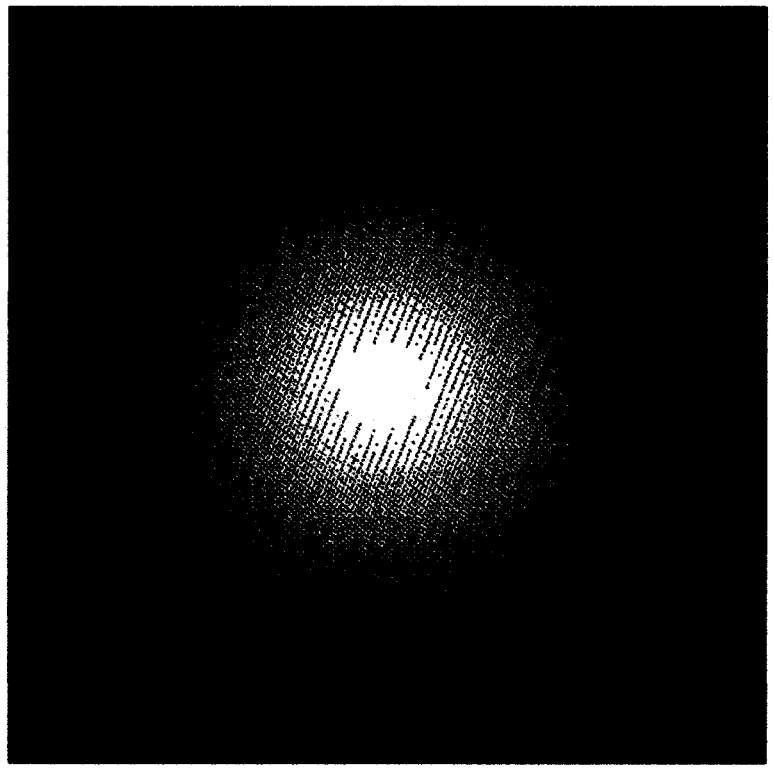
FIG. 3 illustrates another example apodization filter of the image pickup lens described above.
Figure 4:
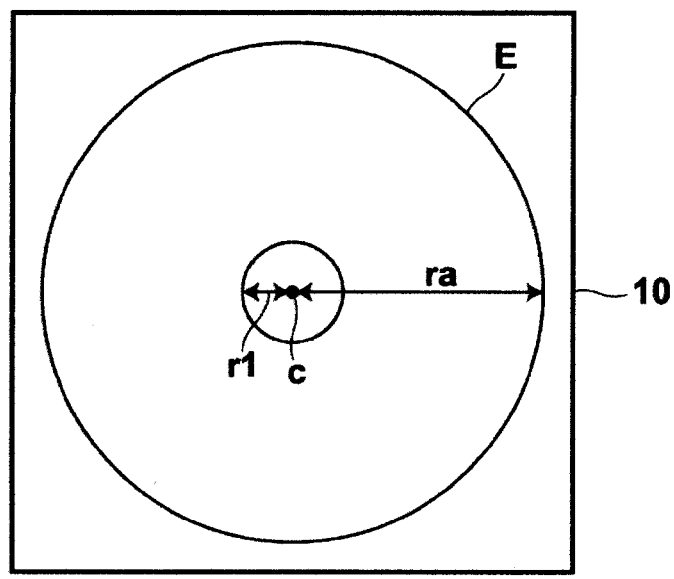
FIG. 4 illustrates a configuration of the apodization filter of the image pickup lens described above.

Hereinafter, embodiments of the present invention will be described in detail with reference to the accompanying drawings. FIG. 1 illustrates a configuration of an image pickup lens according to a first embodiment of the present invention. FIG. 2 illustrates an example apodization filter of the image pickup lens described above. FIG. 3 illustrates another example apodization filter of the image pickup lens described above. FIG. 4 illustrates a configuration of the apodization filter of the image pickup lens described above.

Image pickup lens 1 includes along optical axis Z from the object side in the order of first lens L1 having a positive power, second lens L2 having a negative power, third lens L3 having a positive power, and fourth lens L4 having a positive power, with apodization filter 10 disposed at an aperture position.

Note that FIG. 1 also shows image sensor 5 (Sim) disposed on an image plane that includes the imaging position of image pickup lens 1 considering the case in which image pickup lens 1 is applied to an image pickup apparatus. The image sensor 5 is a device that converts an optical image formed by image pickup lens 1 to an electrical signal and is constituted, for example, by a CCD image sensor or the like.

When the lens is applied to an image pickup apparatus, it is preferable to dispose a cover glass, a low-pass filter, or an infrared light cut filter between fourth lens L4 and the image plane according to the structure of the camera on which the lens is mounted, and FIG. 1 illustrates an example case in which a parallel plate optical member PP, representing such components described above, is disposed. For example, in a case where image pickup lens 1 is applied to a vehicle camera and used as a night vision camera for aiding in night vision, a filter that cuts ultraviolet to blue light may be inserted between fourth lens L4 and the image plane.

Note that a low-pass filter or a particular filter that cuts a specific wavelength range may be disposed between each lens instead of disposing it between fourth lens L4 and the image plane. Alternatively, a coating that acts like one of such filters may be provided on a lens surface of any one of the lenses of image pickup lens 1.

Apodization filter 10 is a filter that gradually decreases the light transmission rate as the distance from the center of the optical axis is increased in a direction perpendicular to the optical axis and changes a light intensity distribution of an out-of-focus image, thereby improving the appearance of the out-of-focus image. Apodization filter 10 is formed by disposing opaque dots according to a honeycomb arrangement from a central portion toward a peripheral portion so as to have, at least partially, a Gaussian distribution like dot density, as shown in FIG. 2, and is structured to satisfy Condition Expression (1) given below when the size of the dots is taken as d. Apodization filter 10 is realized by printing opaque dots on a transparent substrate.

$$0.003 \text{ mm} \leq d \leq 0.010 \text{ mm} \tag{1}$$

Here, if d exceeds the upper limit of Condition Expression (1) above, the light intensity variation is likely to be mottled and the light transmission rate can not be changed accurately. On the other hand, if d exceeds the lower limit of Condition Expression (1) above, the dot becomes too small with respect to the wavelength of the light and is unable to block the light, so that an apodization filter or a peripheral light intensity correction filter is not realized.

The dot arrangement pattern may take any form, other than that shown in FIG. 2, as long as the light transmission rate variation thereof has a desired characteristic and may be, for example, a pattern shown in FIG. 3.

In order to accurately change the light transmission rate according to the distance from the center of the optical axis in a direction perpendicular to the optical axis based on a predetermined rule, it is most preferable that the dot has a regular hexagonal shape. But, in a case where printing or the like is used, in particular, it is difficult to print tiny regular hexagonal dots that satisfy Condition Expression (1) above. Therefore, it is preferable that the dots have a circular shape as a shape that can be achieved more easily. It should be appreciated, however, that the dot shape is not limited to the regular hexagon and circle, and may have other shapes.

When light transmission rate is partially changed by partially changing the opaque dot arrangement density, embodiment of the filter in the manner as described above allows the light transmission rate to be accurately changed to a desired characteristic so that the filter may efficiently exhibit an apodization effect.

Preferably, image pickup lens 1 is configured to satisfy Condition Expression (2) given below when a distance between adjacent dots is taken as D in the honeycomb arrangement. This allows a filter having a favorable characteristic to be realized.

$$0.9d < D < 1.1d \tag{2}$$

Here, if D exceeds the upper limit of Condition Expression (2) above, the distance between dots is too great to block the light, so that an apodization filter or a peripheral light intensity correction filter is not realized. On the other hand, if D exceeds the lower limit of Condition Expression (2) above, the light intensity variation is likely to be mottled and the light transmission rate can not be changed accurately.

Further, when the dot density is reduced and dots are sparsely scattered, an adverse effect that the scattered dots appear as dirt is caused by filter effect. It is, therefore, preferable that the filter is configured such that no dot is disposed within a range of predetermined radius r1 from the center of the filter, as illustrated in FIG. 4, and satisfies Condition Expression (3) given below when an effective radius of the filter is taken as ra. This allows a filter with reduced adverse effect described above to be realized.

$$0.10 ra < r1 < 0.15 ra \quad (3)$$

Here, if r1 exceeds the upper limit of Condition Expression (3) above, it is difficult for the filter to exhibit an advantageous effect because a light intensity change area is small. On the other hand, if r1 exceeds the lower limit of Condition Expression (3) above, the dot scattering and, hence, the adverse effect described above are likely to occur.

The use of the apodization filter in performing imaging under dark environment causes it difficult to obtain a sufficient amount of light for the imaging. Therefore, shifting unit 11 for shifting apodization filter 10 between a position concentric with optical axis Z of image pickup lens 1 and a position outside of the light beam passing through image pickup lens 1 is provided. This allows imaging with or without the filter and, hence, optimum imaging to be performed according to the imaging environment. Note that apodization filter 10 may be shifted manually or electrically, and a conventional mechanism may be employed as the shifting mechanism.

As first lens L1 is a lens disposed on the most object side and if it is used under a severe environment, such as in a vehicle camera, it is preferable that the lens is made of a material which is resistant to surface degradation by the weather, temperature change by direct sunlight, and chemicals, such as grease, detergent, and the like, that is, a material having high water resistance, weather resistance, acid resistance, chemical resistance, and the like. Further, as for the material of first lens L1, it is preferable to use a material which is rigid and not broken easily, and more specifically glass or transparent ceramics is preferably used. Ceramics has high strength and high heat resistance in comparison with ordinary glass.

For example, if image pickup lens 1 is applied to a vehicle camera, the lens is required to be usable in a wide temperature range from an open air temperature in a cold weather region to an in-vehicle temperature in summer of a tropical region. It is, therefore, preferable that the material of all of the lenses is glass. More specifically, it is preferable that image pickup lens 1 is usable in a wide temperature range from −40° C. to 125° C. Further, in order to provide the lenses inexpensively, it is preferable that all of the lenses are spherical lenses, but if the optical performance has priority over the cost, aspherical lenses may be used.

EXAMPLES

Specific examples of numeric values of image pickup lens 1 according to the present invention will now be described.

Example 1

Table 1 summarizes lens data and other data of image pickup lens 1 according to Example 1. Note that the lens configuration is identical to that shown in FIG. 1. In the lens data shown in Table 1, surface number 1 represents a surface of a component disposed at a position closest to the object side and surface number i represents an $i^{th}$ surface from the object side, which is gradually incremented for a surface of a component disposed closer to the image side (i=1, 2, 3, - - - ). The lens data shown in Table 1 include data of aperture position and optical member PP.

Radius of curvature i represents a radius of curvature of $i^{th}$ (i=1, 2, 3, - - - ) surface, and surface separation i represents a surface separation between $i^{th}$ (i=1, 2, 3, - - - ) surface and $i^{th}$+1 surface on optical axis Z. Ndj represents a refractive index of $j^{th}$ optical element for d line, the number j being gradually incremented from the optical element disposed at a position closest to the object side toward the image side (j=1, 2, 3, - - - ), and vdj represents an Abbe number of $j^{th}$ optical element for d line. In Table 1, the radii of curvature and surface separations are shown in mm, and a positive radius of curvature represents a radius of curvature of a surface which is convex toward the object side and a negative radius of curvature represents a radius of curvature of a surface which is convex toward the image side.

In the lens data shown in Table 1, the surface numbers 2 to 9 are aspherical surfaces and values of paraxial radii of curvature are indicated as the aspherical radii of curvature. Aspherical surface data in Table 2 include the surface numbers of aspherical surfaces and associated aspherical surface coefficients. The aspherical surface coefficients represent values of each of coefficients k and n (n=integer of not less than 3) in the aspherical surface equation given below.

$$Z = \frac{cr^2}{1+\sqrt{1-(1+k)c^2 r^2}} + \sum_{i=1}^{N} \alpha_i \rho^i$$

where,

Z: depth of aspherical surface (mm), h: distance (height) from optical axis to lens surface (mm), k: eccentricity, C: near axis curvature=1/R, and Bn: $n^{th}$ order aspherical surface coefficient

TABLE 1

| SURFACE | RADIUS OF CURVATURE | SURFACE SEPARATION | Nd | vd |
| --- | --- | --- | --- | --- |
| 1 | ∞ | 0.000000E+00 | | |
| 2 | 1.496769E+00 | 6.511512E−01 | 1.53 | 52.7 |
| 3 | 1.245553E+01 | 1.039314E−01 | | |
| 4 | 9.403221E+00 | 3.999548E−01 | 1.63 | 23.3 |
| 5 | 2.834828E+00 | 8.793728E−01 | | |
| 6 | −4.335708E+00 | 5.770832E−01 | 1.53 | 52.7 |
| 7 | −1.666235E+00 | 3.112359E−01 | | |
| 8 | 0.000000E+00 | 5.914254E−01 | 1.51 | 56.0 |
| 9 | 1.570968E+00 | 7.000000E−01 | | |
| 10 | ∞ | 3.000000E−01 | 1.52 | 64.1 |
| 11 | ∞ | 3.616123E−01 | | |
| 12 | ∞ | 0.000000E+00 | | |

TABLE 2

| SURFACE | κ | B3 | B4 | B5 | B6 |
|---|---|---|---|---|---|
| 2 | −1.497874E−01 | 5.648723E−04 | 9.525896E−03 | −6.269463E−02 | 2.600279E−01 |
| 3 | 4.816038E+01 | −8.145744E−03 | −2.058189E−02 | −5.733437E−02 | −1.783071E−01 |
| 4 | 7.760695E+00 | −1.566531E−02 | −1.388737E−02 | −5.773125E−02 | 1.396737E−03 |
| 5 | 5.707611E+00 | 1.086792E−02 | −6.027370E−02 | 1.184873E−01 | −1.999951E−02 |
| 6 | 8.071327E+00 | −3.601328E−02 | 1.016754E−01 | −1.201088E−01 | 6.577541E−02 |
| 7 | −4.162742E−01 | −7.656110E−02 | 1.143450E−01 | −6.122552E−03 | 5.576642E−02 |
| 8 | −1.000000E+00 | −1.532595E−01 | −9.318749E−02 | 9.268453E−02 | −1.561030E−02 |
| 9 | −5.164289E+00 | −1.859248E−01 | 5.197532E−02 | −1.183104E−02 | 8.516802E−03 |

| SURFACE | B7 | B8 | B9 | B10 |
|---|---|---|---|---|
| 2 | −6.555126E−01 | 9.412698E−01 | −7.213488E−01 | 2.100191E−01 |
| 3 | 4.529087E−01 | −7.065818E−01 | 7.699111E−01 | −3.550066E−01 |
| 4 | −2.949968E−01 | 5.472221E−01 | −1.122046E−01 | −1.104891E−01 |
| 5 | −1.978584E−01 | 8.771605E−02 | 2.625959E−01 | −1.587690E−01 |
| 6 | −1.994927E−01 | 3.446570E−01 | −2.363137E−01 | 5.403846E−02 |
| 7 | −1.424874E−01 | 2.857411E−02 | 8.649386E−02 | −3.905706E−02 |
| 8 | 1.054486E−02 | −1.044593E−03 | −2.727241E−03 | 5.400477E−04 |
| 9 | −6.524415E−03 | 4.547466E−03 | −2.342151E−03 | 3.902648E−04 |

Figure 5:
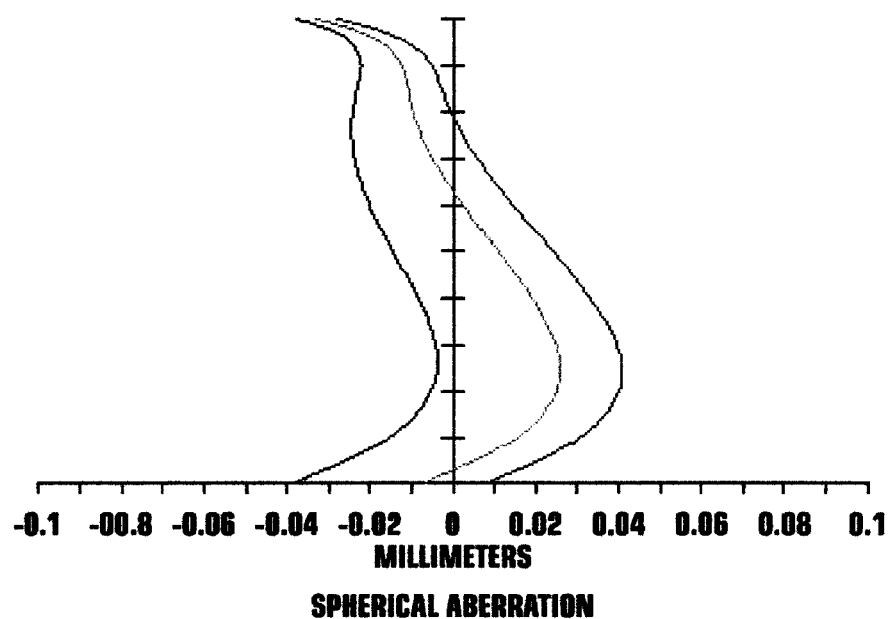
FIG. 5 illustrates a spherical aberration of an image pickup lens according to Example 1 of the present invention.
Figure 6:
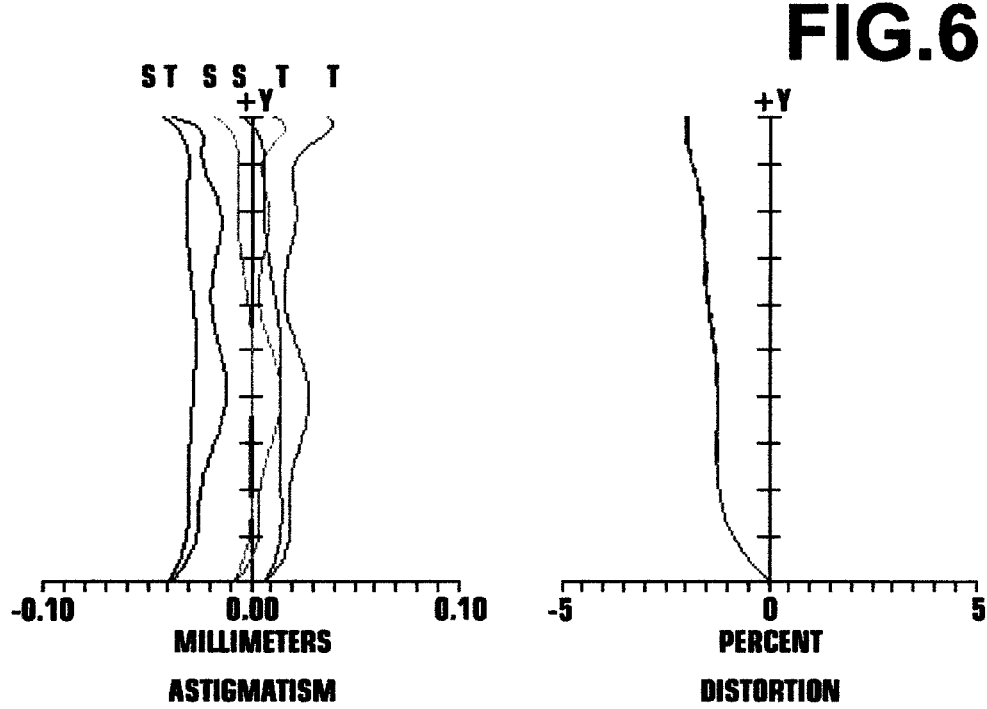
FIG. 6 illustrates a curvature of field and a distortion of the image pickup lens according to Example 1 of the present invention.
Figure 7:
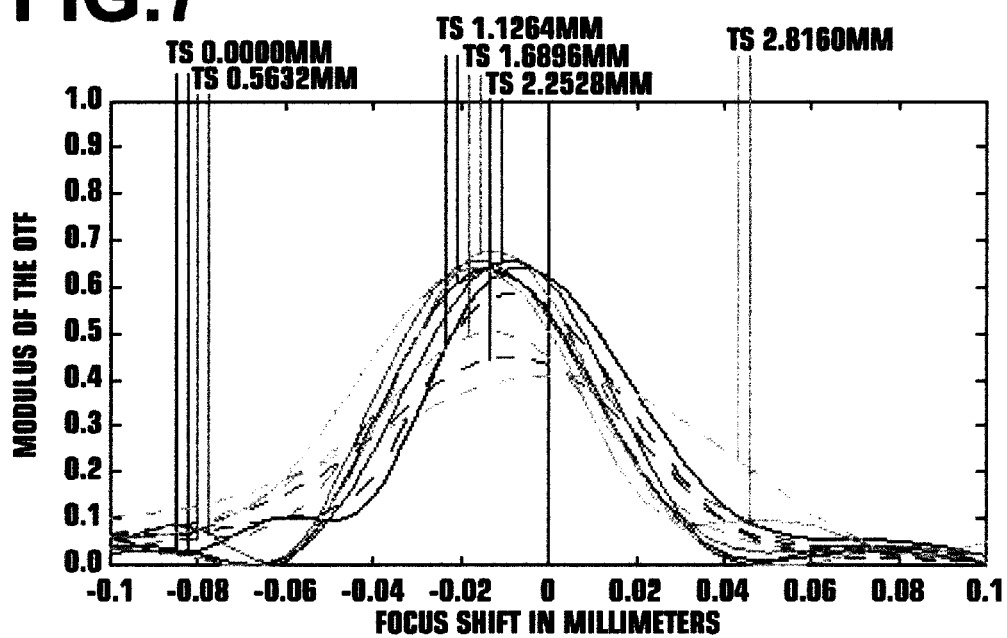
FIG. 7 illustrates OTF characteristics (without apodization filter) of the image pickup lens according to Example 1 of the present invention.

FIGS. 5 and 6 respectively show a spherical aberration, and astigmatism and a distortion of the image pickup lens according to Example 1 described above. FIG. 7 illustrates OTF characteristics of image pickup lens 1 according to Example 1 in a case where apodization filter 10 is disposed at a position outside of the light beam passing through image pickup lens 1, and FIG. 8 illustrates OTF characteristics of image pickup lens 1 according to Example 1 in a case where apodization filter 10 is disposed at the aperture position (concentrically with optical axis Z of image pickup lens 1).

Figure 8:
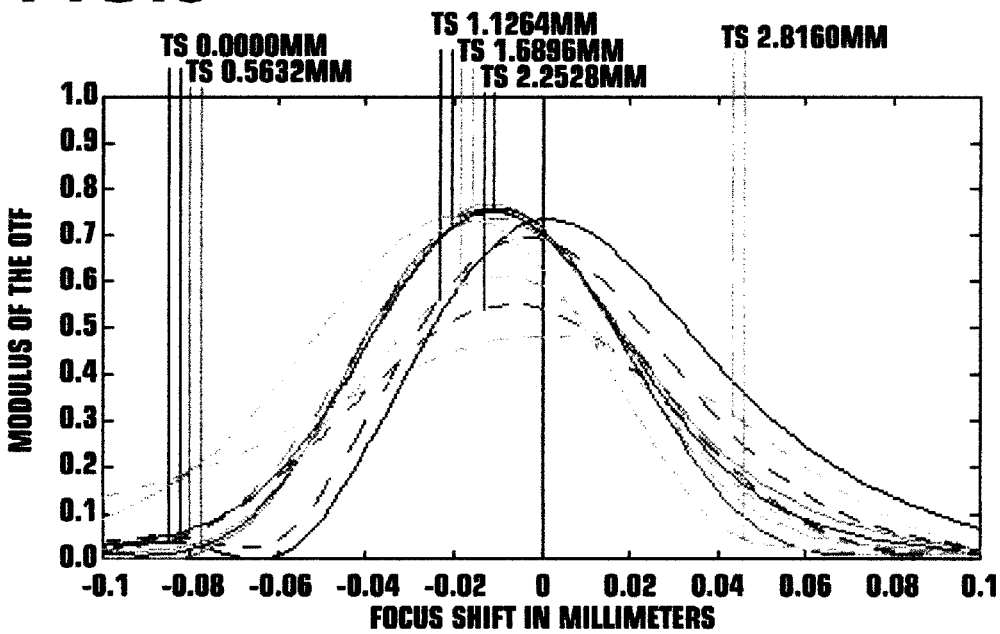
FIG. 8 illustrates OTF characteristics (with apodization filter) of the image pickup lens according to Example 1 of the present invention.

As illustrated in FIGS. 7 and 8, the use of apodization filter 10 may largely improve the overall OTF characteristics.

Figure 9:
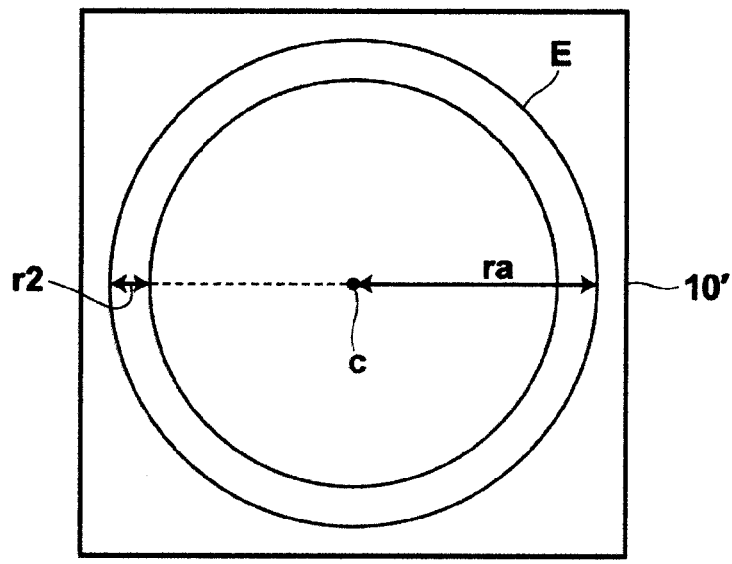
FIG. 9 illustrates a configuration of a peripheral light intensity correction filter of the image pickup lens described above.

Next, a second embodiment of the present invention will be described. FIG. 9 illustrates a configuration of a peripheral light intensity correction filter of an image pickup lens according to the second embodiment of the present invention.

The present embodiment differs from the first embodiment in that it uses a peripheral light intensity correction filter instead of the apodization filter.

Contrary to the apodization filter, peripheral light intensity correction filter 10' gradually increases the light transmission rate as the distance from the center of the optical axis is increased in a direction perpendicular to the optical axis and equalizes light intensities in a central portion and a peripheral portion on the image forming plane.

Here, when the dot density is reduced and dots are sparsely scattered, an adverse effect that the scattered dots appear as dirt is caused by filter effect. It is, therefore, preferable that the filter is configured such that no dot is disposed within a range of predetermined radius r2 from an effective radius position of the filter, as shown in FIG. 9, and the filter satisfies Condition Expression (4) given below when an effective radius of the filter is taken as ra. This allows a filter with reduced adverse effect described above to be realized.

$$0.10ra < r2 < 0.15ra \quad (4)$$

Here, if r2 exceeds the upper limit of Condition Expression (4) above, it is difficult for the filter to exhibit an advantageous effect because a light intensity change area is small. On the other hand, if r2 exceeds the lower limit of Condition Expression (4) above, the dot scattering and, hence, the adverse effect described above are likely to occur.

Figure 10:
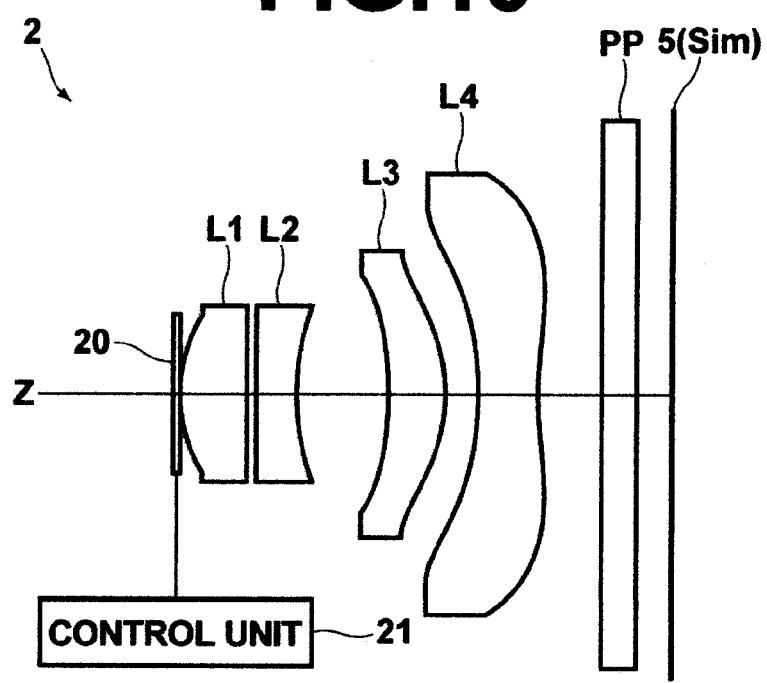
FIG. 10 illustrates a configuration of an image pickup lens according to a third embodiment of the present invention.

Next, a third embodiment of the present invention will be described. FIG. 10 illustrates a configuration of an image pickup lens according to the third embodiment of the present invention.

The present embodiment differs from the first embodiment in that it uses an apodization filter formed of a transmissive liquid crystal panel in which only areas of the dots exhibits opacity instead of the apodization filter formed by printing opaque dots on a transparent substrate.

Apodization filter 20 is constituted by a transmissive liquid crystal panel capable of switching the dot areas between a transparent state and an opaque state. Control unit 21 is connected to apodization filter 20 to perform control of dot display on the transmissive liquid crystal panel. Note that the dot arrangement pattern is identical to that of the first embodiment.

The use of a filter, such as an apodization filter or a peripheral light intensity correction filter, in performing imaging under dark environment causes it difficult to obtain a sufficient amount of light for the imaging. But the embodiment of the image pickup lens in the manner as described above allows imaging with or without the filter and, hence, optimum imaging to be performed according to the imaging environment.

Further, the use of the transmissive liquid crystal panel eliminates the need to shift the apodization filter as required in the first embodiment, whereby the structure may be simplified.

The filter of the present invention may be changed into a peripheral light intensity correction filter by changing the dot arrangement pattern.

Figure 11:
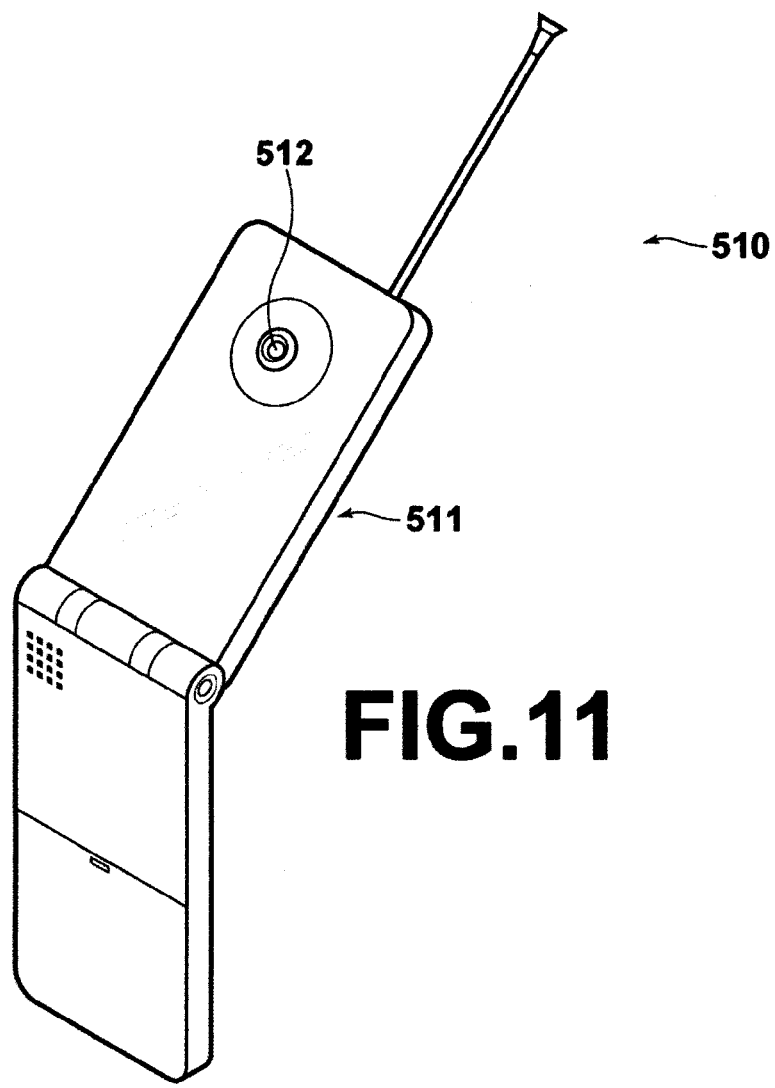
FIG. 11 illustrates a cell phone device, a portable terminal device having the image pickup lens described above.
Figure 12:
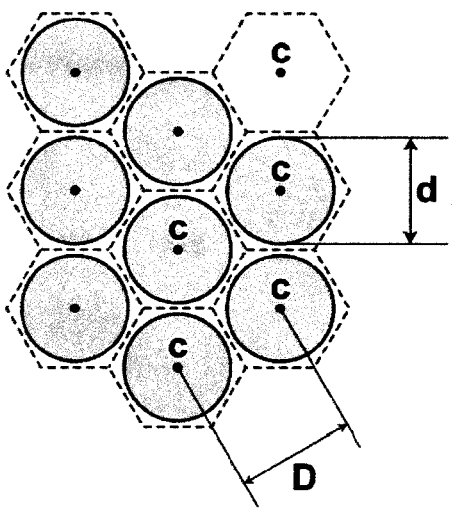
FIG. 12 illustrates honeycomb arrangement

FIG. 11 illustrates a cell phone device, a portable terminal device having the image pickup lens of the present invention.

As illustrated in FIG. 11, cell phone device 510 includes image pickup lens 512 of the present invention inside of housing 511 of the cell phone device.

An image pickup lens of a conventional portable terminal device can be easily replaced with the image pickup lens of the present invention. That is, a conventional image pickup lens of any known portable terminal device can be replaced with the image pickup lens of the present invention without changing the device size, shape, and the like, whereby a portable terminal device of the present invention may also be constructed.

It should be appreciated that the devices to which the image pickup lens of the present invention is applicable are not limited to the portable terminal devices described above and the image pickup lens of the present invention can be applied to anything as long as it includes an image pickup lens.

So far imaging apparatus of the present invention has been described. It should be appreciated that the present invention is not limited to the embodiments described above and various modifications and changes may be made without departing from the spirit and scope of the present invention.

What is claimed is:

1. A filter to be disposed concentrically with an optical axis of an imaging lens to exhibit an apodization effect or a peripheral light intensity correction effect,
wherein the filter includes opaque dots disposed according to a honeycomb arrangement from a central portion toward a peripheral portion so as to have, at least partially, a Gaussian distribution like dot density and is structured to satisfy Condition Expression (1) given below when a size of the dots is taken as d $$0.003 \text{ mm} \leq d \leq 0.010 \text{ mm} \qquad (1).$$

2. The filter of claim 1, wherein the filter satisfies Condition Expression (2) given below when a distance between adjacent dots is taken as D in the honeycomb arrangement $$0.9d < D < 1.1d \qquad (2).$$

3. The filter of claim 1, wherein the dots have a circular shape.

4. The filter of claim 1, wherein the peripheral portion has a higher dot density than that of any other portion of the filter.

5. The filter of claim 4, wherein no dot is disposed within a range of predetermined radius r1 from the center of the filter and the filter satisfies Condition Expression (3) given below when an effective radius of the filter is taken as ra $$0.10ra < r1 < 0.15ra \qquad (3).$$

6. The filter of claim 1, wherein the peripheral portion has a lower dot density than that of any other portion of the filter.

7. The filter of claim 6, wherein no dot is disposed within a range of predetermined radius r2 from an effective radius position of the filter and the filter satisfies Condition Expression (4) given below when an effective radius of the filter is taken as ra $$0.10ra < r2 < 0.15ra \qquad (4).$$

8. The filter of claim 1, wherein the filter comprises a transparent substrate on which the dots are printed.

9. An image pickup lens having the filter of claim 8, an imaging lens, and a shifting unit for shifting the filter between a position concentric with an optical axis of the imaging lens and a position outside of a light beam passing through the imaging lens.

10. The filter of claim 1, wherein the filter comprises a transmissive liquid crystal panel capable of exhibiting opacity only in areas of the dots.

11. An image pickup lens having the filter of claim 10, an imaging lens, and a control unit for switching the areas of the dots of the transmissive liquid crystal panel between a transparent state and an opaque state.

12. An image pickup lens having the filter of claim 1 imaging lens.

13. An image pickup apparatus having the image pickup lens of claim 12.

14. A portable terminal device having the image pickup lens of claim 12.

* * * * *